United States Patent [19]

Reunamäki

[11] Patent Number: 4,617,043
[45] Date of Patent: Oct. 14, 1986

[54] METHOD OF DRIVING A GLASS TEMPERING SYSTEM AND A GLASS TEMPERING SYSTEM FOR CARRYING OUT THE METHOD

[75] Inventor: Pauli T. Reunamäki, Nattari, Finland

[73] Assignee: O/Y Kyro A/B, Finland

[21] Appl. No.: 762,449

[22] Filed: Aug. 5, 1985

[30] Foreign Application Priority Data

Oct. 3, 1984 [FI] Finland ................................. 843880

[51] Int. Cl.$^4$ ............................................. C03B 27/04
[52] U.S. Cl. ......................................... 65/29; 65/114; 65/349; 65/350; 65/351
[58] Field of Search .................... 65/29, 114, 349, 350, 65/351

[56] References Cited

U.S. PATENT DOCUMENTS

| | | | |
|---|---|---|---|
| 1,856,669 | 5/1932 | Sylvester | 65/349 X |
| 3,264,079 | 8/1966 | McKelvey | 65/29 |
| 3,776,707 | 12/1973 | Inoue et al. | 65/29 |
| 3,994,711 | 11/1976 | McMaster | 65/114 X |
| 4,138,241 | 2/1979 | McKelvey | 65/114 X |

*Primary Examiner*—Arthur Kellogg
*Attorney, Agent, or Firm*—Burns, Doane, Swecker & Mathis

[57] ABSTRACT

The present invention relates to a method of driving a glass tempering system and to a glass tempering system for carrying out the method. The main components of the system are a loading section, a heating furnace, a quench and cooling section and an unloading section. The sections are provided with conveyors, which are made of horizontal rollers and can be driven in unison or separately. The furnace and quench and cooling section conveyors are provided with a common drive mechanism for driving the conveyors either at the same rate of speed or for permitting stoppage of the quench and cooling section conveyor. Instead of stopping the quench and cooling section conveyor, it can be coupled to the common drive mechanism through a reduction gear to effect a very slow movement after the quenching is finished and a glass sheet load is being cooled to a handling temperature. By stopping the glass or setting the glass in the quenching and cooling section in very slow motion after quenching, stresses are produced in the already quenched glass which do not normally damage the quenched glass but which shatter those glasses that would later break due to pre-existing faults. Moreover, the stationary or very slowly moving conveyor minimizes damage to the quench and cooling section rollers when glasses shatter. During the quenching, the furnace oscillates empty without a sheet glass load so that the furnace will have time to compensate for a furnace overload caused by even the thickest glass sheets prior to passage of fresh glass sheet load into the furnace.

14 Claims, 11 Drawing Figures

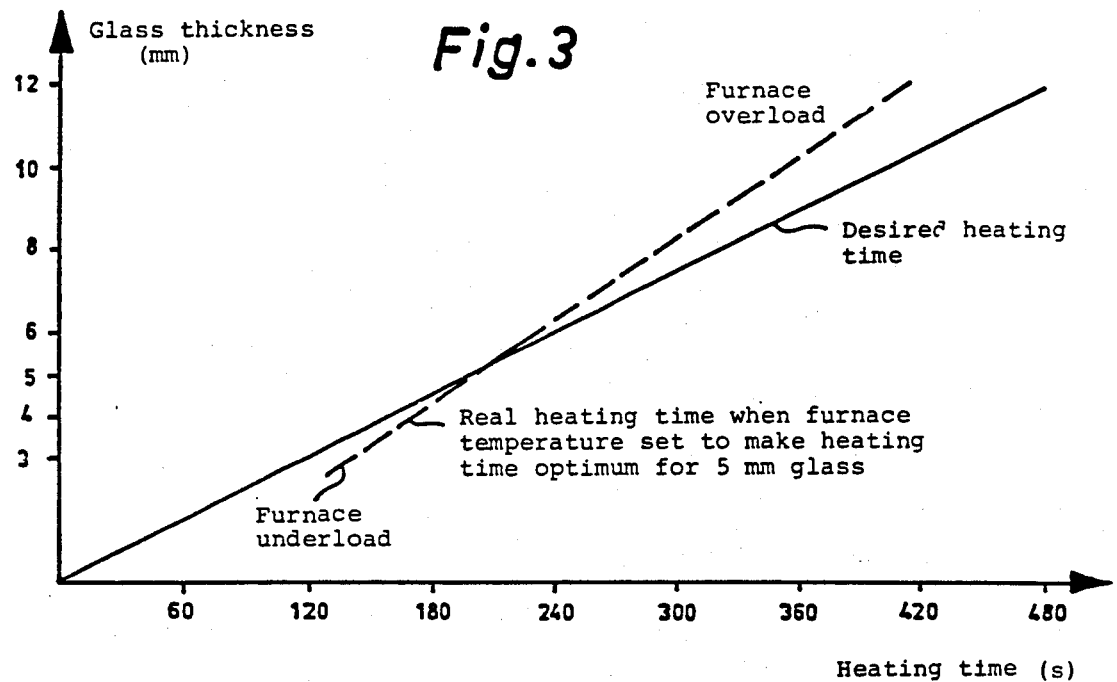
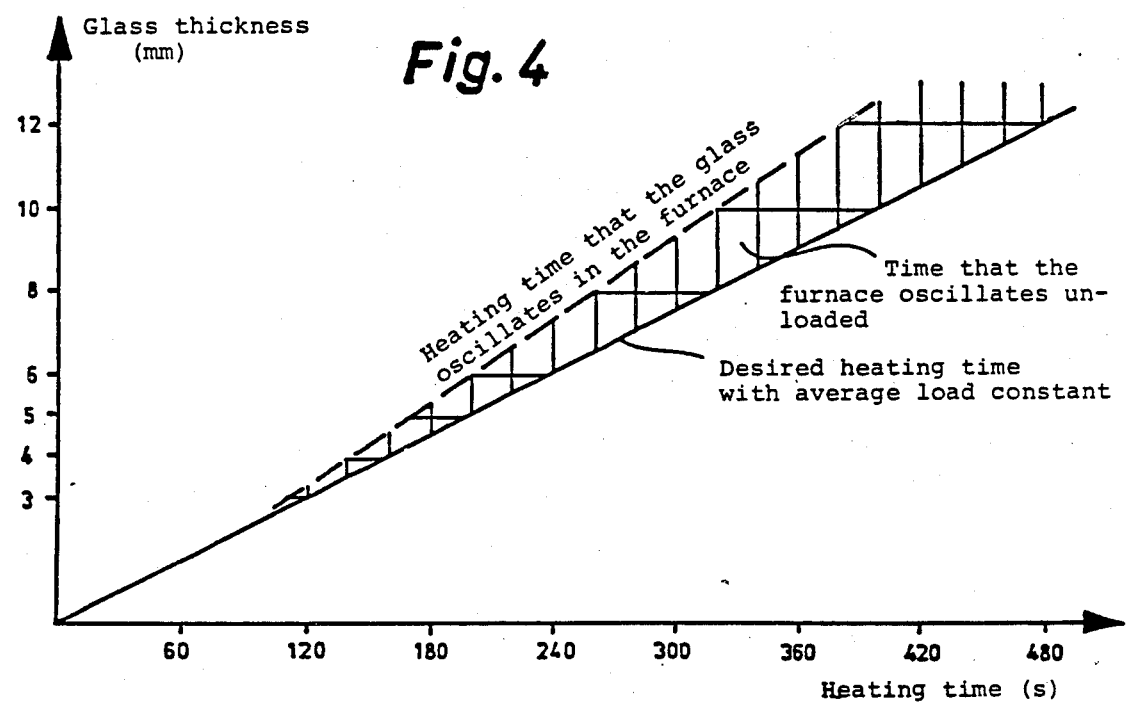

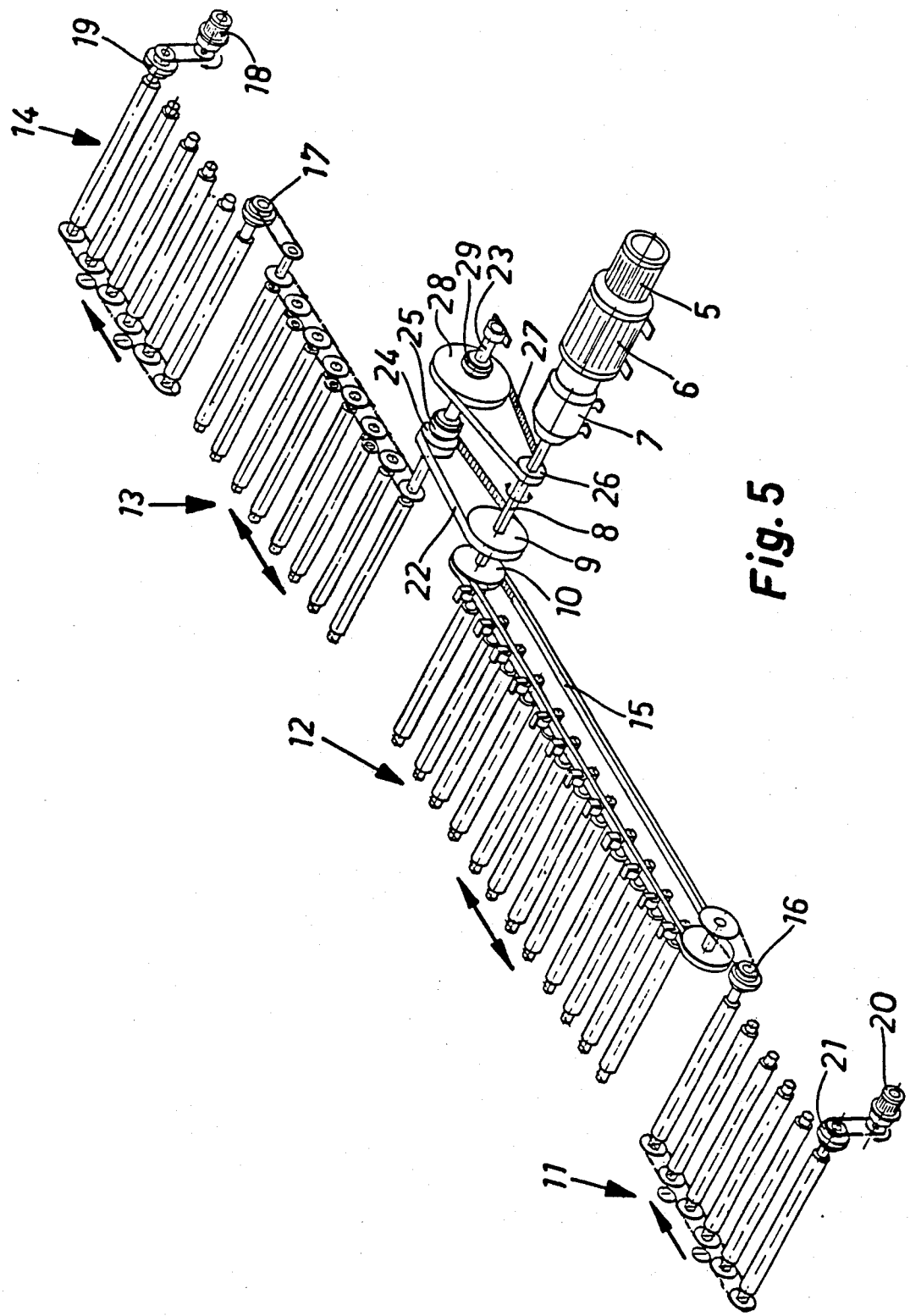

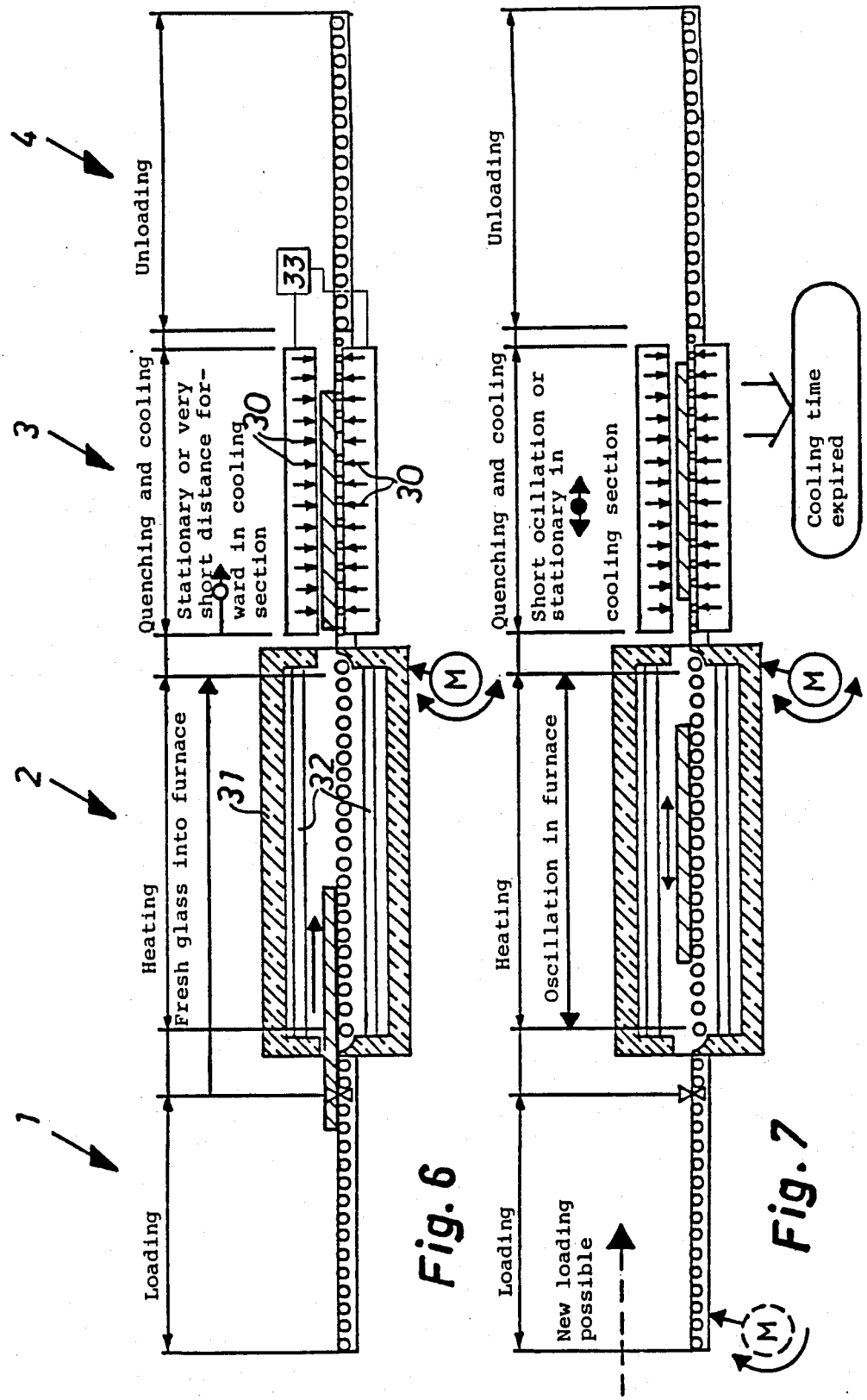

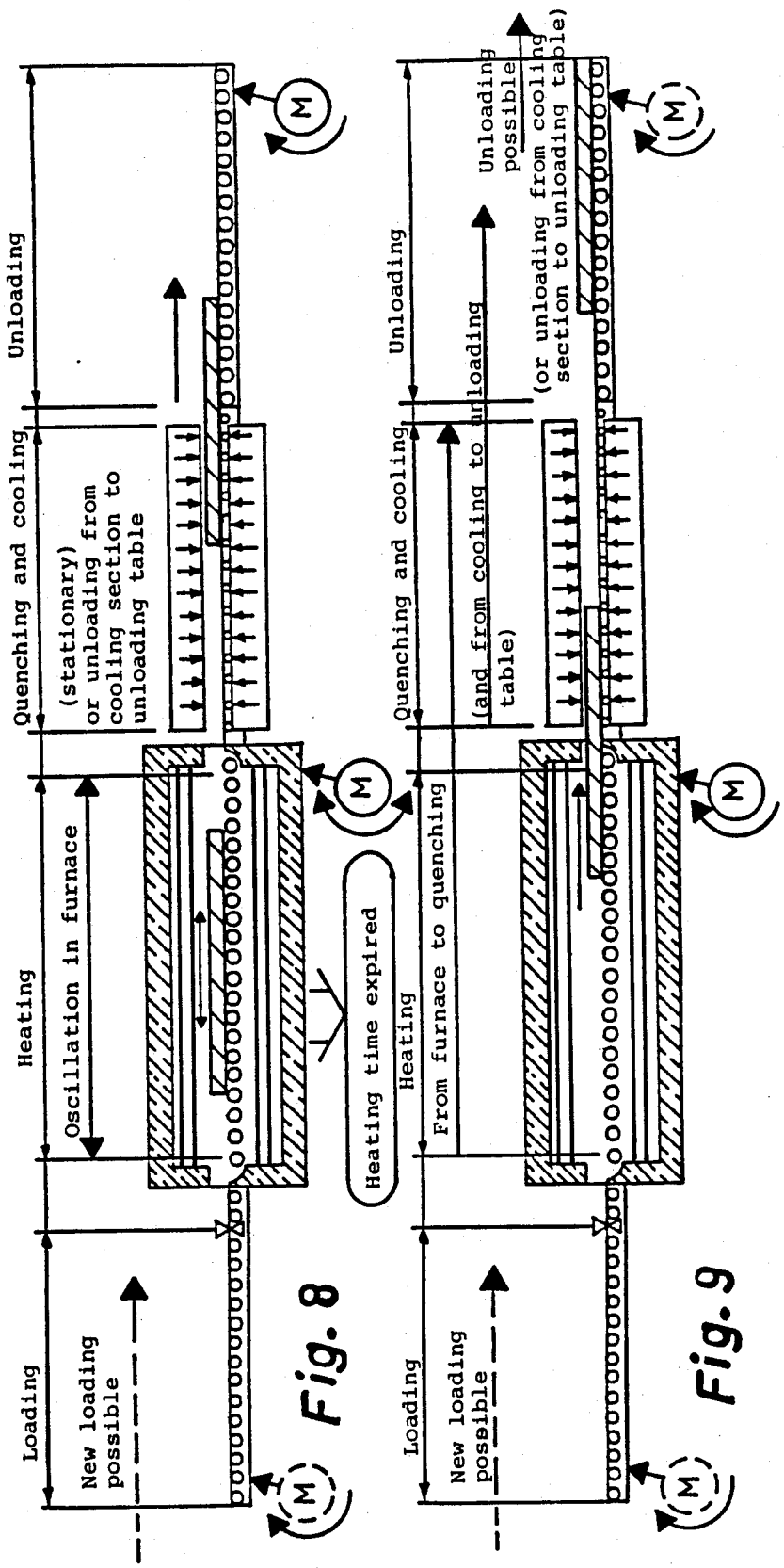

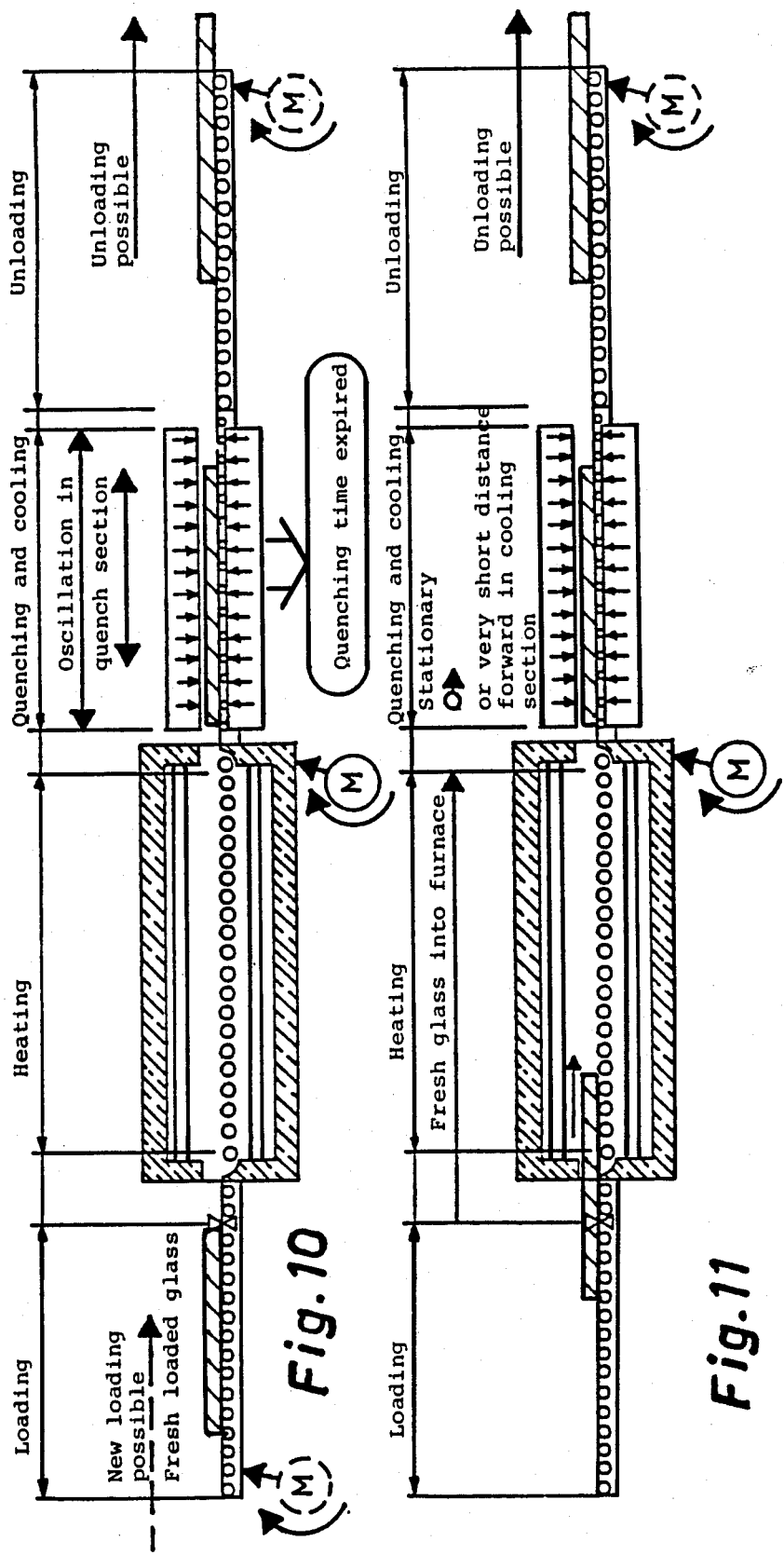

METHOD OF DRIVING A GLASS TEMPERING SYSTEM AND A GLASS TEMPERING SYSTEM FOR CARRYING OUT THE METHOD

BACKGROUND AND SUMMARY OF THE PRESENT INVENTION

The present invention relates to a method of driving a glass tempering system, the system includes:
- a loading section,
- a heating furnace including a thermally insulated chamber with heating resistances therein,
- a quench and cooling section, including cooling equipment fitted with air blowers,
- an unloading section,
- conveyors in each section and furnace, comprised of horizontal rollers arranged transverse to the glass conveying direction,
- drive mechanisms for the conveyors,
- clutch mechanisms for driving the separate conveyors in unison or separately.

In the method, the furnace conveyor is oscillated back and forth while heating the glass sheets to their tempering temperature and the quench and cooling section conveyor is oscillated back and forth at least while effecting the quenching of glass sheets.

German Patent specification No. 704 219 discloses a glass tempering system having a first index cycle during which the conveyors are oscillated for heating a glass sheet load in the furnace while a glass sheet load in the quench and cooling section is quenched and cooled while oscillating, and a second index cycle during which both conveyors perform a single long conveying stroke for carrying the glass sheet load from the furnace to the cooling section. If the mutually coupled furnace and cooling section conveyors are driven at the same speed, no effective length difference will be obtained between furnace and cooling section although this would be desirable to provide the furnace with a sufficient effective length and, on the other hand and regardless of that length, in order to make the cooling section as short and inexpensive as possible.

A long continuous-action furnace, connected with a short, oscillating conveyor equipped quench and cooling station, has been disclosed in U.S. Pat. No. 2,140,282. However, with relatively small glass production series and with the dimensions of glass sheets to be tempered often changing, it is desirable to drive also the furnace in an oscillating fashion since, in this way, the furnace can be more readily and quickly adjusted to changes.

Great Britian Patent Specification No. 1 527 782 discloses a solution, wherein both the furnace and quench and cooling section conveyors operate in an oscillating fashion connected to each other, but the quench and cooling section is shorter than the furnace. A necessary difference in speed between the conveyors in the furnace and the quench and cooling section is achieved by a reduction gear.

Another related disclosure is contained in U.S. Pat. No. 3,994,711, wherein the conveyors of the furnace and quench and cooling station are fitted with their own separate drive mechanisms for driving the conveyors independently of each other, i.e., with separate motors. Since this patent suggests that the length of the oscillations within the furnace is greater than the length of the sheet glass load to be heated (i.e., the furnace is at least twice as long as the maximum glass load length), the economically acceptable length of the quench unit is only a fraction of the furnace. Accordingly, the use of the independent conveyor drives made it possible to select the period, stroke length and/or speed of one conveyor for a given purpose regardless of the period, stroke length and/or speed of the other, i.e. to be equal or unequal depending on the situation. The long length of the furnace relative to the quench unit in practice substantially requires separate motors, i.e., independent drives, in order to maintain the speed of movement during quenching at a sufficient level while maintaining the glass sheet within the quench and permitting full length movement of another glass load in the furnace.

A corresponding solution has been proposed as early as 1930 in German Patent specification No. 511 244 which discloses that the conveyors of a glass annealing furnace be driven independently of each other, e.g., with separate motors, for driving adjacent, oscillating pre-cooling and cooling section conveyors at different speeds. This independent driving by two separate conveyors is due to the different requirements in the sections. However, this German specification also teaches driving the section conveyors at the same speed to effect the transfer of glass from one section to the other. Another patent disclosing oscillation of workpieces in a heating chamber and subsequently transferring the workpieces to an independently operated quenching chamber is U.S. Pat. No. 3,447,788.

Thus, it has appeared that the conveyors require separate drives independent of each other in order to provide a solution to the problem of giving the furnace and quench conveyors different oscillation lengths, necessitated by the relative lengths of the sections for economical operation and by glass sheet loads of unequal lengths.

However, it has been possible to design a suitable system even without the independent and separate conveyor drives. Applicant's German Patent specification No. 3 035 591 and corresponding Great Britain Patent Specification No. 2 059 941 describe a system wherein the conveyors are mechanically linked together and driven dependently on each other by a single drive motor. Graduation from independent separate drive to a single-motor drive was possible by basing the operation of a system on a new principle of controlling the movements. According to that principle, accurate information is acquired about the length of each glass sheet load and, while continuously observing the position of a carried glass sheet, a microprocessor is used to precalculate ratings for the movements of a glass sheet load in the furnace and in the quench and cooling section. With this operating principle, the length of the furnace can be shortened while retaining proper heating of the glass sheet. For example, the gear ratio for mechanically connecting the separate conveyors to a single drive mechanism may be calculated. Compared with a dual-motor drive disclosed in U.S. Pat. No. 3,994,711, this solution made it possible to simplify the system design substantially and to cut down the costs of a drive assembly since two independently driven but nevertheless mutually synchronized DC-motors with their control systems (as in U.S. Pat. No. 3,994,711) is approximately five times more expensive than a single AC-motor with its hydraulic variator for reversing the unidirectional rotation of a motor into alternating rotation at a desired speed and stroke as in Applicant's British and German patent specifications.

The present invention also utilizes a single drive motor, allowing the use of a simple and inexpensive hydraulic variator and its associated control system, since there is no conveyor speed synchronization problem when moving glasses from the furnace to the quench and cooling section. A normal hydraulic variator cannot be used in parallel with another similar hydraulic variator, since even a slight difference in the speed of rotation shifts the entire load on the hydraulic variator running at the higher speed of rotation. On the other hand, since a tempering process does not require highly accurate speed control (a 5% speed setting is quite sufficient), a special arrangement for coupling two hydraulic variators together would be unreasonably expensive due to doubled equipment and the need of particularly accurate control. In addition, such systems are complicated and susceptible to faults and thus hazardous in terms of a tempering process since, if a load of glass remains in the furnace because of some malfunction till overheating, such load may damage, for example, highly valuable ceramic rollers in the furnace. The present invention differs substantially from the above-described prior art in the sense that during the quench cycle, wherein a glass sheet is oscillated in the quench and cooling section at a sufficient rate of speed for quenching in order to prevent the sagging of a still soft glass sheet between the rollers or to prevent the formation of roller marks on a soft glass surface, the furnace conveyor is oscillated unloaded, i.e., without a glass sheet load at the same speed and stroke length as the conveyor in the quench and cooling section. Not until the quenching is completed, i.e., after the temperature in the center of the glass sheets is lower than the "strain point" of the particular raw glass material, is the movement in the quench and cooling section conveyor altered by activation of appropriate clutches so that a fresh load of glass may be passed into the furnace to be heated. While this glass sheet load is oscillated in the furnace and as soon as a glass sheet load in the quench and cooling section has cooled down to a suitable handling temperature, the quench and cooling section conveyor may be mechanically coupled with the unloading section conveyor and the glass sheet load carried from the quench and cooling section to the unloading section. The oscillation of a glass sheet load in the furnace is continued for a necessary period of time with the quench and cooling section empty, i.e., without a glass sheet load to be quenched or cooled. Alternatively, the glass in the quench and cooling section can be retained therein until the glass sheet load in the furnace is properly heated. Thereafter, the glass sheet load is transferred from the quench and cooling section to the unloading section simultaneously with the transfer of the glass sheet load from the furnace to the quench and cooling section. In a preferred embodiment of the invention, the coupling of the quench and cooling section conveyor with the furnace conveyor is changed, after a proper period of time for quenching has expired, from the 1:1 gear ratio to a reduction gear having a gear ratio so high that, at the maximum rate of oscillation of the furnace conveyor, the maximum travelling speed of a glass sheet in the quench and cooling section will be less than or equal to 2.5 cm/sec. This rate of speed is so slow that its use during quenching is not feasible. The purpose of this slow movement is explicitly to produce a suitably irregular cooling blast to the surface of an already quenched glass sheet to be cooled in order to produce strains in a glass sheet. Similar strains may be introduced in the glass sheets by providing an arrangement for permitting relatively slow, short movements of the cooling air nozzles. The significance of these strains will be explained later. The preferred embodiment of the present invention is especially useful when tempering a highly fragile glass sheet with holes near the edges and/or with the edges provided with recesses or the like irregularities.

In an alternative embodiment, after a suitable length of time for quenching has expired, the glass in the quench and cooling section is stopped completely to produce strains in the already quenched glass sheet from the blowing of air from the nozzles against the surface of the stopped glass sheet.

The embodiment in which the glass sheet load is moved very slowly in the quench and cooling section has certain operational advantages over the embodiment in which the glass sheet load is stopped completely after quenching. The loss of glass due to breakage in the quench and cooling section is slightly reduced since the glass sheets are moving slightly relative to the air nozzles. If the conveyor and the glass sheet load are maintained totally stationary, too great a strain may be introduced in the glass sheet causing breakage of a glass sheet which is actually properly tempered. Glass sheets having holes, notches, rough finishes and the like are particularly susceptible to breakage for such great strains even when the glass is otherwise properly tempered.

Moreover, the very slow speed movement of the quench and cooling section ensures that the roller themselves are not exposed to one-sided cooling from below or heating from the glass sheet load which one-sided heat effect may cause slight bending or curving of the rollers. This deformation of the rollers causes fluttering of the glass sheets subsequently transferred to the quench and cooling section. The fluttering increases the risk of breakage of the glass and may cause a reduction in the optical quality of the glass.

The method and system for embodying the present invention offer, e.g., the following important advantages:

1. The wearing and breaking hazard of the quench and cooling section rollers is reduced.
2. The design construction and system control are simplified.
3. Thermal equilibrium of the furnace is maintained with all glass thicknesses.
4. It is ensured that most of the glass sheets too susceptible to breakage in transportation, installation or use will be removed in advance.

The following description will deal with the reasons which lead the invention to the above advantages.

It has been found in practice that, when tempering glass, e.g., float glass, the temper or its uniformity will no longer change when temperature of the glass center on cooling passes the temperature corresponding to the "strain point", at this point the glass viscosity is according to definition $10^{14.5}$ poise.

The "strain point" of today's most commonly used float glass is typically slightly over 500° C. It is a general fact that all presently manufactured flat glasses have a "strain point" higher than 500° C. Therefore, in the tempering process if the temperature of glass center is lower than 500° C., the quenching step has certainly been effected. At lower temperatures, the question is merely cooling the glass to a suitable handling temperature.

The quench times of glasses tempered to the normal degree of temper are as follows (the center temperature receding below 500° C.):

| Thickness | Time |
| --- | --- |
| 3 mm | circa 3.5 sec |
| 4 mm | circa 6.0 sec |
| 5 mm | circa 9.0 sec |
| 6 mm | circa 14.0 sec |
| 12 mm | circa 60.0 sec |

When tempering glass, the uniformity of quenching at various points of glass is highly important since irregular quenching leads easily to extra losses, decreased strength of the final product and optical distortions (for example, bluish spots if polarized light is reflected from the glass). On the other hand, in the cooling cycle it has been found to be important to have sufficient irregularity of cooling to result in breakage of some of the faulty glasses since the warranty costs of glasses shattered during transportation, installation and use are relatively speaking extremely high when compared with the removal of faulty glasses in the production stage.

Against this background it can be appreciated, as described in more detail hereinafter, that one significant advantage gained by the present invention is the decrease of wearing and damage to the coating of the quench and cooling section rollers.

The coating of the quench section rollers generally comprises spirally-wound heat-resistant string, fiberglass stocking pulled over the rollers or a plurality of rings threaded on the rollers (See, e.g., U.S. Pat. No. 4,421,482).

A general problem with the quench section rollers has been that their coating is readily worn down and damaged because of the sharp glass edges. Especially in a situation where the glass to be tempered shatters in the quench and cooling section, the roller coating is easily damaged. Breakage of glass in the quench and cooling section is statistically very common. Depending on the types of glasses to be manufactured, the thermomechanical properties of a tempering plant and the control values set by the operator, the breakage percentage varies within the range of 0.2-10%.

Shattering of glass occurs typically as follows:

In the quench cycle itself, it is generally impossible to notice any changes in glasses. Immediately after the quench cycle, when the inner parts of glass have passed the "strain point", the glass first breaks into larger fragments and later, as the glass cooling proceeds, these larger fragments keep "exploding" into smaller and smaller bits. The larger fragments of glass encountered at the start of the shattering process are the most inconvenient in terms of the quench and cooling section rollers, since the size of these fragments is often such that they drop between the rollers and remain upright on top of or between cooling nozzles, such that the sharp glass edges cut the coatings of the quench and cooling section rollers.

By substantially slowing or even stopping rotation of the rollers immediately after the quenching cycle in accordance with the present invention and by maintaining the slow movement or stoppage of the rollers during the stage of large glass fragments, any fragments from glasses that have "exploded" cannot damage the rollers but, instead, tend to fall down harmlessly between blast nozzle distributing ducts to the bottom of the quench and cooling section.

The fall of glass bits can be further facilitated by drawing the cooling blast nozzles away just before coupling the cooling section conveyor with the unloading station conveyor and removing intact glasses onto the unloading table. This movement of the blast nozzles provides more space between the nozzles and rollers, permitting the glass crumbs to fall down more freely.

The high gear ratio and the slow movement achieved thereby according to the preferred embodiment of the present invention is preferably utilized with all glasses including, in particular when manufacturing glasses that are highly fragile during the manufacturing process. These fragile glasses include glasses with holes near the glass edge or small-radius recesses at the glass edge. The purpose of the slow movement is just to slightly relocate the blowing during the cooling, so that, e.g., the neck (a very delicate spot) between the hole and the glass edge would not be continuously exposed to the center of a blast which could cause the breakage of glass even if such glass in terms of statistical probability were acceptably solid for external loads. However, this movement during cooling is so slow that, if used in quenching, the result would be irregularly tempered and hence unacceptable glass.

If the quench and cooling section conveyor is adapted to run through a high-ratio gear during the cooling cycle, the result achieved in terms of roller wear is not quite as favorable as that accomplished by stopping the conveyor completely but, however, a major improvement over the prior art is achieved since the travelling speed of the quench and cooling section conveyor rollers is less than 1/10 the speed of the furnace conveyor rollers. Moreover, substantial uneven cooling of the quench and cooling section rollers is avoided.

Another significant advantage gained by the invention is that, while it is possible to use just one drive motor, loading into the furnace can be carried out at a time different from unloading from the furnace into the quench and cooling section. Thus, it is not necessary to run an empty working cycle even if the loading on the loading section is not finished by the time the heating period in the furnace has run out.

If the high-gear ratio embodiment is utilized, loading of the furnace can only be effected when the glass in the quench section has indexed towards the furnace a distance $A = K_V L$ where: $K_V$ = transmission ratio of gear, e.g., 1:10 (preferably around 1:15); and L = length of loading movement from the loading table to the furnace end which faces towards the quench and cooling section.

There are no other limitations to the commencement of furnace loading and the calculation set out in the Applicant's prior Great Britain Pat. No. 2 059 941 for selection of a transmission ratio is not needed at all.

A third important advantage gained is that the loading of a furnace is more uniform with all glass thicknesses. The reason for this is that the furnace conveyor is oscillated unloaded during quenching. The tempering plant furnaces are typically very massive, e.g., ceramic rollers retain in themselves a lot of thermal energy. Therefore, changing of the temperature in a furnace is a tedious procedure and even if the temperature could be changed quickly in the air space of a furnace, the roller temperature will change very slowly.

It has been found in practice that maintaining the furnace temperature constant at all glass thicknesses is highly important since oscillating tempering plants are typically employed in short series production, wherein the thickness of the glasses to be tempered varies several times a day.

On the other hand, the thermal equilibrium of a furnace is very sensitive to overloading. In particular, the temperature of the furnace rollers drops rapidly since, these rollers serve in practice as rotating heat exchangers between the lower section heating elements and the glass. The more heat that the roller must transfer per unit time, the greater their temperature drop with respect to the lower section temperature.

The temperature drop of the rollers, depending on the loading thereof, is a common problem to all roller-equipped horizontal tempering plants. For example, U.S. Pat. No. 3,994,711 suggests that the furnace of an oscillating tempering plant be twice as long as the longest possible glass (glass loading) such that the rollers have regular intermediate periods without a glass load for equalizing their temperature both from above and below. A problem in this type of solution is the high price due to the length of a furnace and the fact that the rollers are without a load of glass for varying times, i.e., the rollers in the center of a furnace are a lot colder than those at the ends of a furnace where the glass arrives seldom and stays a shorter period of time compared to the center rollers.

It has been found in practice that, in terms of the present requirements, the roller temperature is satisfactorily controllable if the heating time of glasses to be heated in a furnace to a tempering temperature is longer than 40 sec per mm of thickness. Thus, the heating time of, e.g., 6 mm glass should be at least 240 seconds. When a furnace is made substantially shorter, there is always a glass on some of the rollers aside from a simultaneous loading and unloading cycle, during which the rollers will be without a load of glass for a few seconds. Therefore, it is desirable to provide an arrangement for permitting the furnace to re-establish thermal equilibrium.

However, the heating time of glasses in a furnace is not directly proportional to the glass thickness since thicker glasses absorb more of the radiated power of a furnace. The real rate of heating to a tempering temperature typically follows the times set out in FIG. 3, assuming that the furnace temperature stays constant. As a matter of fact, if a furnace is set at the optimum temperature for 3 mm glass, the furnace will be overloaded by 20% on 12 mm glasses with a result that the optical quality of thick glasses suffers and the breakage of glasses during the tempering process increases dramatically.

As effected by the method according to the present invention, the heating rate of glasses is set out in FIG. 4. The furnace temperature has been increased in a manner that also 3 mm glass can be heated in optimum time. And with thicker glasses, use is made of the unloaded period of furnace which, with increasing glass thickness, grows longer in a manner that the average optimum load is achieved (compare the increase of quench time with the increase of glass thickness).

The unloaded period of the furnace is very beneficial since during this period the rollers receive compensating heat also from the top chamber of the furnace to further improve the thermal equilibrium of the rollers. With the thickest glasses in particular, the significance of thermal equilibrium has typically been most important since thick glasses are often also large in area, thus adding rapidly to the susceptibility to breakage and to the problems of optical quality.

BRIEF DESCRIPTION OF THE DRAWINGS

The present invention will now be described in greater detail with reference to the accompanying drawings, wherein like members bear like reference numerals, and wherein:

FIG. 1 illustrates that, as the center of glass reaches the "strain point", quenching is finished and thereafter a tempered glass sheet is cooled to a handling temperature. The lower curve depicts a temperature difference between the center and the surface with reference to the right-hand scale;

FIG. 3 is a graph illustrating the mutual dependence between glass thickness and the required heating time. The solid line depicts the desired dependence with furnace load at optimum (i.e., not causing under- or overloading of the furnace) on varying glass sheet thicknesses. The dashed line depicts real dependence in a case where the furnace temperature is set such that with 5 mm glass the heating time is at optimum. It will be noted that, with thinner glass sheets, the furnace underloads and, with thicker glass sheets, the furnace overloads;

FIG. 4 is a graph of a dependence corresponding to FIG. 3 in a system operating on a method of the present invention. The lined area depicts the time that the furnace oscillates unloaded. As this period matches the time spent for quenching, it will increase as glass thickness increases. It has been possible to raise the furnace temperature so that even 3 mm glasses heat within optimum time. Thus, as the glass thickness increases, the correspondingly growing overload will have suitable time for compensation during the time that the furnace oscillates unloaded;

FIG. 5 is a perspective view of the conveyors of a system designed for embodying the method of the present invention including the drive mechanisms for the conveyors; and FIGS. 6–11 are schematic side views of an apparatus of the present invention in various operating cycles of the method.

DETAILED DESCRIPTION OF THE PREFERRED EMBODIMENTS

Figure 1:
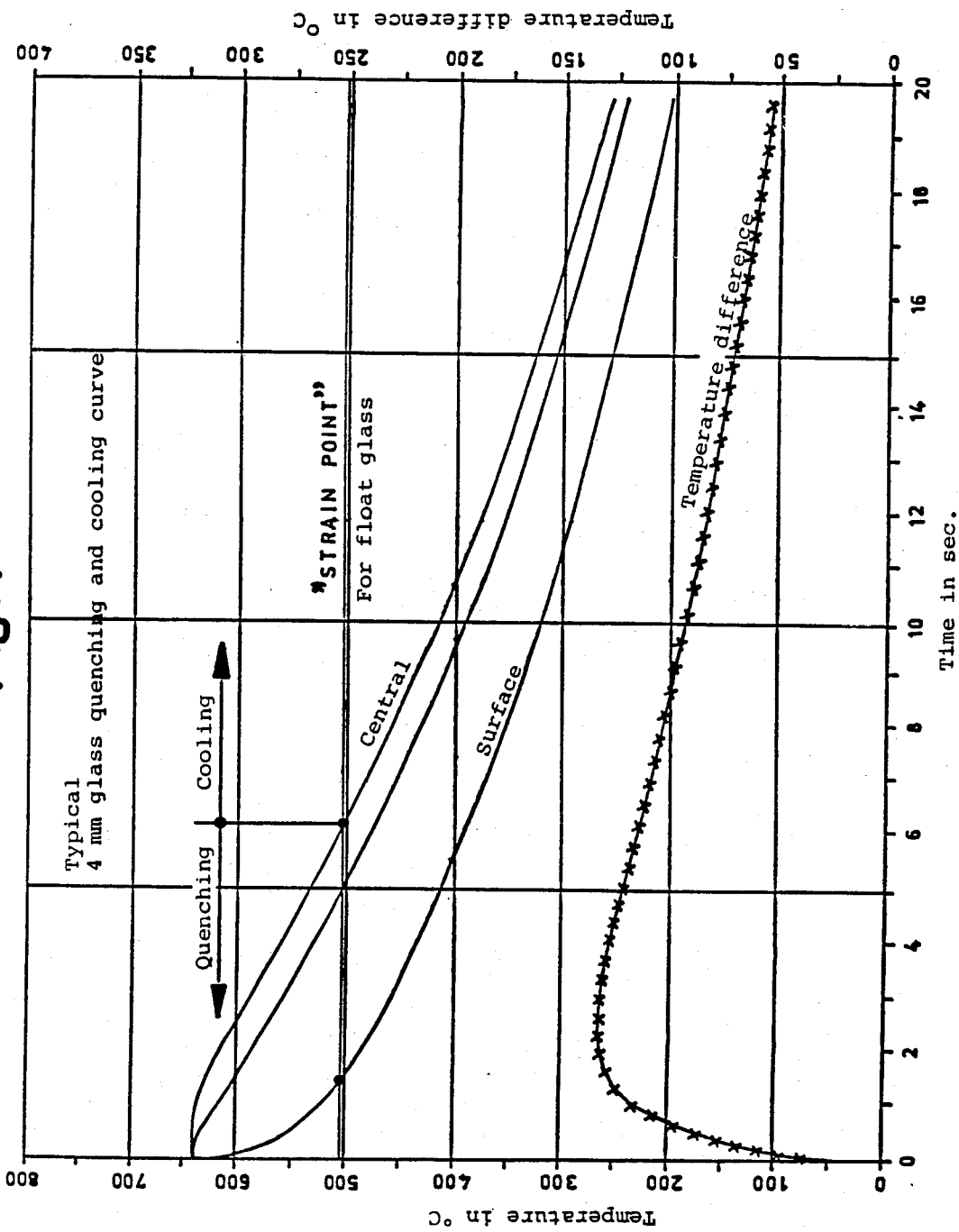
FIG. 1 is a graph of a typical quenching and cooling curve for a 4 mm thick glass sheet.
Figure 2:
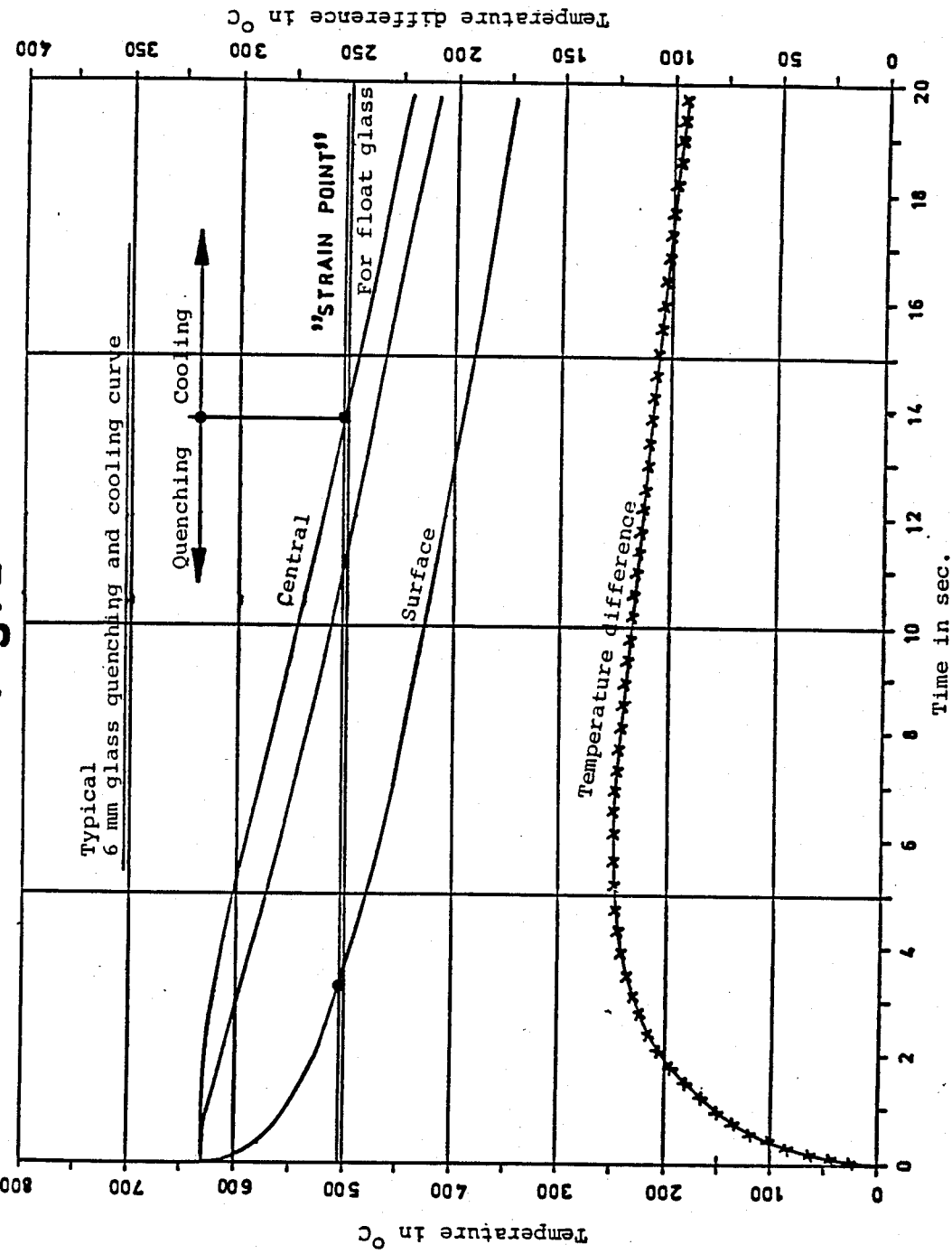
FIG. 2 is a graph similar to FIG. 1 illustrating quenching and cooling of a 6 mm thick glass sheet.

With reference to FIG. 6, the system comprises successively a loading section 1, a heating furnace 2, a quench and cooling section 3 and an unloading section 4. The heating furnace 2 includes a thermally insulated chamber 31 fitted with heating resistances 32. The quench and cooling section 3 is provided with cooling elements fitted with air blowers 30. All sections and the furnace are provided with conveyors consisting of horizontal rollers arranged transverse to the glass indexing direction, the design and operation of the conveyors being described in more detail hereinafter with reference to FIG. 5.

With reference to FIG. 5, a roller table 11 forms the loading section conveyor, a roller table 12 forms the furnace conveyor, a roller table 13 forms the quench and cooling section conveyor and a roller table 14 forms the unloading section conveyor. The rollers of the loading section conveyor 11 are coupled to rotate together by an endless chain which engages chain sheaves at one end of the rollers. In a similar manner, the rollers of conveyors 13 and 14 are also coupled to rotate together by endless chains. The furnace rollers 12 are journalled to the furnace housing. Mounted on the roller ends and extending out of the furnace are friction wheels against which the upper run of an endless belt 15 is pressed by spring-loaded press rolls.

A unidirectional AC-motor 5 drives a hydraulic variator 6 which through a reduction gear 7 drives a transmission shaft 8, on whose end is mounted a reversing wheel 10 for the belt 15. With the hydraulic variator 6, the rotation of the motor 5 can be made alternating. Thus, the shaft 8 can be rotated either in alternating fashion or in a single direction.

Connected to the conveyor of the quench and cooling section 13 is another transmission shaft 23, coupled by transmission means 9, 22, 24 for mechanical transmission engagement with the shaft 8. This transmission engagement can be uncoupled with a magnetic clutch 25. The gear ratio of this mechanical transmission is 1:1, i.e., the rollers of conveyors 12 and 13 rotate at the same speed and, if driven in an alternating fashion, have the same stroke length.

In the application of a method of the invention, no other transmission engagement is necessary between shafts 8 and 23 when tempering normal glass sheets. However, it has been found in practice preferable for creating desired test strains to slightly relocate a glass sheet during the cooling cycle after quenching particularly when tempering highly fragile glass sheets with holes, recesses or the like irregularities at the edges. Therefore, in a preferred embodiment of the invention, the two shafts 8, 23 are coupled together also by another transmission engagement, which has a high gear ratio, at least 10:1 and preferably about 15:1, and more preferably about 13:1. This transmission engagement or connection is effected by belt or chain pulleys 26, 28, linked together by a belt or chain 27. This transmission connection can be uncoupled by a magnetic clutch 29.

For carrying the glass sheets from the loading conveyor 11 into the furnace or from the quench and cooling section 13 onto the unloading conveyor 14, the conveyors 11 and 12 are connected by a transmission chain coupled and uncoupled by a magnetic clutch 16 and the conveyors 13 and 14 are connected by a transmission chain coupled and uncoupled by a magnetic clutch 17.

In addition, for indexing the glass sheets on the loading table 11 during the loading action, a motor 20 may be connected by a magnetic clutch 21 to the loading conveyor. When magnetic clutch 21 is closed, magnetic clutch 16 will be open. Also, for indexing the glass sheets on the unloading table 14 for unloading the same, a motor 18 is connected through a magnetic clutch 19 to the conveyor 14. When magnetic clutch 19 is closed, the magnetic clutch 17 will be either open or closed.

Operation of the present system will now be described with reference to FIGS. 6–11. In order to better understand the operation, these figures only include that motor which at a given time is operating. Dashed lines indicate another motor that can be operated if necessary.

The operational sequence commences with FIG. 6 where a first glass sheet load has already been heated in the furnace, carried to the quench and cooling section where its quenching has been effected with the furnace empty. This tempered glass sheet is now in the quench and cooling section to be cooled down to a handling temperature. Now, a glass sheet in the quench and cooling section 3 is either stationary (magnetic clutches 25 and 29 opened) or it moves extremely slowly and a very short distance (magnetic clutch 25 opened and magnetic clutch 29 closed). In the latter alternative, a glass sheet in the quench and cooling section must be indexed towards the furnace to the previously mentioned outset position before a fresh glass sheet can be moved into the furnace. Thus, FIG. 6 shows how the drive mechanism 5, 6 of FIG. 5 drives the furnace conveyor in one direction for carrying a glass sheet into the furnace while at the same time a quenched glass sheet ready for cooling is either stationary or moves a very short distance forward.

With reference to FIG. 7, in the following stage the drive mechanism 5, 6 drives the furnace conveyor in an oscillating manner while a glass sheet is heating in the furnace. A quenched, cooling glass sheet in the quench and cooling section is either stationary or runs very short oscillation by a movement so slow (less than 2.5 cm/sec) that it could not be used in connection with quenching but, with respect to glass already quenched, this stillness or slow movement produces the effect to be described hereinbelow.

First studied is the background that is the basis for the invention of holding a glass sheet to be cooled stationary or in extremely slow movement. One of the most serious arguments against the characteristics of tempered glass in the building industry is that a small amount of the total production of tempered glasses are such that they may explode to pieces during storage, transporation or installation without any visible reason. A small number of glasses also explode too easily after the installation.

A basic characteristic of tempered glass is that, if a single spot in the glass fails, the entire glass will "explode" into tiny fragments due to the internal stresses in the glass.

On the other hand, flat glass from which tempered glass is produced by heat treatment always has minor faults. Such faults include air bubbles, minor unmelted ingredients or small cracks appearing mainly at the edges. These minor glass faults appear as a statistical set. Glass faults may be such that the glass always explodes upon tempering, some faults again are such that even a small external extra load (even merely passage of time) will cause explosion of the glass.

Stopping or slowly moving the glass in the cooling step after the quench cycle produces, through non-uniform cooling, extra stresses which are of such an order that at this stage only those glasses explode whose susceptibility to exploding is clearly too high. Accordingly, the method of the present invention only eliminates really certain cases of possible failure but does not cause any extra losses, considering the total loss from glass tempering production to finished glasses installed at their site.

The strain test effected in the cooling cycle does not affect other characteristics of tempered glass, such as uniformity of tempering or the actual temper, which are already created during the quench cycle. In addition to the above, the procedure naturally reduces damages to and wearing of the roller coatings.

The fall of glass bits can be further facilitated by drawing the cooling blast nozzles 30 away with a suitable actuating arrangement 33 (FIG. 6) just before coupling the cooling section conveyor with the unloading station conveyor and removing intact glasses onto the unloading table. This movement of the blast nozzles 30 provides more space between the nozzles and rollers, permitting the glass crumbs to fall down more freely.

During the operation cycle illustrated in FIG. 7, a fresh loading onto the loading table is also possible. Thus, the shifting of the glass along the loading section can be performed by the loading table's own motor.

In the operational cycle illustrated in FIG. 8, the oscillating of a glass sheet in the furnace continues. As soon as a glass sheet in the quench and cooling section has cooled down to a suitable handling temperature, the conveyors 13 and 14 (FIG. 5) may be coupled together by the magnetic clutch 17. Also, the magnetic clutch 19 is closed and the unloading table motor 18 is driven to carry a glass sheet load from quench and cooling section 3 to the unloading section 4. Both magnetic clutches 25 and 29 are open and the furnace conveyor can continue oscillation for a required heating time while the quench and cooling section 3 is empty. Alternatively, the glass sheet load may be retained in the quench and cooling section (either moving slowly or stopped) until the heating cycle is completed. Thereafter, the glass sheet load in the furnace and the quench and cooling section are transferred simultaneously to the quench and cooling section and the unloading section, respectively. Also in the operation cycle illustrated in FIG. 8, a fresh loading is possible.

In the operational cycle illustrated in FIG. 9, the heating time has expired and the glass sheet is carried from the furnace to the quench and cooling section. At this time, the drive mechanism 5, 6 rotates the shaft 8 in the same direction and the magnetic clutch 25 is closed. If the quench and cooling section still contains a glass sheet load by the end of the heating time, the quench and cooling section load will be carried onto the unloading table at the same time that a glass sheet load is moved from the furnace to the quench and cooling section. FIG. 9 further shows that unloading from the unloading table is possible by use of the motor 18 when the magnetic clutch 17 is opened and the magnetic clutch 19 is closed. Also, a fresh loading onto the loading table is possible at this time.

With reference to FIG. 10, in another important step in the method of the invention, glass sheet load indexed into the quench and cooling section is oscillated at full stroke and a sufficient rate of speed in order to prevent a glass sheet, which is still soft during quenching, from sagging between the rollers and to prevent the rollers from impressing marks on the glass surface. Thus, the drive mechanism 5, 6 drives shaft 8 back and forth and the transmission having the gear ratio of 1:1 is coupled on by the magnetic clutch 25. The furnace conveyor 12 oscillates empty at the same rate of speed as the quench and cooling section for a sufficient time to restore the thermal equilibrium in the furnace. The duration of the quenching cycle increases as the glass thickness increases (FIG. 4). What should be noted is that, while the duration of the quenching time increases as the glass thickness increases, also the furnace overload and the resetting time required thereby will increase.

It should be noted that if a glass sheet is placed in the furnace during the quenching time (an event undesired in ordinary operation of the system since thermal equilibrium in the furnace may not be established), the oscillation stroke length in the quench and cooling section may not be sufficiently long to produce end-for-end in the furnace which is the desired stroke length. The problem of end-for-end oscillation in the furnace and quench and cooling section is particularly problematic when using glass sheet loads of different lengths in the furnace and quench and cooling section. This discrepancy in static lengths is further magnified if the furnace length is greater than the length of the quench and cooling section length.

However, due to the advantages of the present invention, the furnace may be made shorter compared to the prior art due, in part, to the unloaded operation of the furnace to establish thermal equilibrium. Accordingly, it is reasonable to make the length of the furnace and the quench and cooling section equal thereby permitting the same stroke length and speed for a given length of glass sheet both in the furnace during heating and in the quench and cooling section during quenching.

Moreover, the provision of a furnace and a quench and cooling section of the same length provides certain advantages for the operation of the tempering system of the present invention. For example, the maximum length of the glass sheet load which can be processed, both in a single cycle and continuously, is increased. For example, with a furnace which is 4.2 meters in length a maximum length of a single glass sheet load to be heated is 3.3 meters. However, if the quench and cooling section is 3.6 meters, this maximum length load cannot be reasonably run continuously. However, if the quench and cooling section is also 4.2 meters long, this length glass sheet load may be run continuously. Also, the maximum-maximum length glass sheet load (i.e., the loading and processing of a single sheet glass load) is greater than the 3.3 meter limit. These longer continuous and maximum-maximum glass loads are particulary desired by certain customers for glass tempering systems. Due to the overall decrease in the furnace length permitted by the present invention, the slightly increased length required in the quench and cooling section to provide equal length sections does not require a commercially unacceptable increase in power consumption of the quench and cooling section.

As described above with reference to FIGS. 3 and 4, the furnace loading will be irregular at various glass thicknesses when the furnace temperature is constant and the furnace is operated in a manner that the next glass arrives in the furnace at the same time as the preceding one exits toward the quench and cooling section. On the other hand and according to the present invention, when the glass is not forwarded into the furnace until after the preceding glass is quenched, the furnace loading will remain substantially constant at all glass thicknesses. Nevertheless, the production volume of the system can be maintained at a level equal to previous systems by slightly raising the furnace temperature since the great masses in the furnace ensure that the furnace temperature does not change significantly during a single glass loading.

It has been found in practice that the furnace overload does not become apparent at once but only after 3 to 4 loadings, when glasses begin to shatter. Thus, during one loading cycle there may first be a higher overload in the furnace if the same cycle also includes an empty period during which the roller temperature will be compensated. The compensation of temperature is based on the fact that, while the furnace is empty, the rollers do not deliver heat to a glass sheet load and at the same time the rollers receive heat both from below and above. FIG. 10 further indicates that both unloading and loading are possible during this time.

After the quench period has expired, the cycle proceeds as illustrated in FIG. 11. If the quenched glass sheet is stopped completely, the magnetic clutch 25 (FIG. 5) is opened. The already open magnetic clutch 29 stays open. A glass sheet in the quench and cooling section may stop in any position at all and transfer of a fresh glass sheet into the furnace can be commenced without any conditions. As soon as the quench time has expired, the furnace conveyor 12 stops, magnetic clutch 25 opens and the magnetic clutch 16 of the loading conveyor 11 closes and, at the same instant, the rate of speed of the furnace conveyor 12 accelerates from zero to full index rate for carrying a glass sheet from the loading table into the furnace. At the same time the high-ratio gear may be engaged to permit the very slow movement of the glass sheet in the quench and cooling. Alternatively, the glass sheet in the quench and cooling section may remain stationary. During this operation cycle, unloading is possible. The operational cycle now corresponds to that illustrated in FIG. 6, i.e. a total working cycle is completed.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A method of driving a horizontal glass tempering system, said system including a loading section, a heating furnace including a thermally insulated chamber with heating means therein, a quench and cooling section having cooling equipment therein including air blowers, an unloading section, conveyors in each section and in the furnace, each conveyor being comprised of horizontal rollers transverse to the glass carrying direction, drive mechanisms for the conveyors, clutch mechanisms for driving separate conveyors in unison or separately; the glass tempering system oscillating the rollers of the furnace conveyor back and forth while heating the glass sheets to a tempering temperature and oscillating the quench and cooling section conveyor back and forth while effecting the quenching of glass sheets; the method comprising the steps of:
   oscillating the furnace conveyor mechanically coupled together with the quench and cooling section conveyor while quenching a glass sheet load in the quench and cooling section with the furnace being in an unloaded condition to reestablish a thermal equilibrium in the furnace;
   uncoupling the quench and cooling section conveyor from the furnace conveyor to stop the former conveyor after a glass sheet load in the quench and cooling section has been quenched with the temperature in the center of glass sheets of the load being lower than the strain point of this particular glass raw material forming the glass sheet load; and
   subsequently moving a fresh glass sheet load to be heated into the furnace.

2. The method as set forth in claim 1, further comprising the steps of:
   mechanically coupling the quench and cooling section conveyor with the unloading table conveyor as soon as a stationary glass sheet load in the quench and cooling section is cooled to a suitable handling temperature, for transferring a glass sheet load from the quench and cooling section to the unloading section while oscillating the glass sheet load in the furnace; and
   continuing the oscillating of a glass sheet load in the furnace while the quench and cooling section is unloaded without a glass sheet load to be quenched or cooled.

3. The method as set forth in claim 1 being utilized for tempering a highly fragile glass sheet with holes, recesses or other irregularities at the edges thereof, further comprising the steps of:
   coupling the quench and cooling section conveyor with the furnace conveyor after a glass sheet load in the quench and cooling section is tempered with the temperature in the center of glass sheets is lower than the strain point of the particular glass raw material through a reduction gear having a gear ratio sufficiently high such that, at the maximum rate of speed of the oscillation of the furnace conveyor, the maximum rate of speed of a glass sheet load in the quench and cooling section is less than or equal to 2.5 cm/sec;
   moving a fresh glass sheet load to be heated into the furnace;
   uncoupling said reduction gear as soon as a glass sheet load in the quench and cooling section is cooled to a suitable handling temperature while the glass sheet load is oscillated in the furnace;
   coupling the quench and cooling section conveyor mechanically with the unloading section conveyor for moving the glass sheet load from the quench and cooling section to the unloading section; and
   continuing the oscillation of the glass sheet load in the furnace while the quench and cooling section is unloaded without a glass sheet load to be quenched or cooled.

4. The method as set forth in claim 1, further comprising the step of drawing the cooling equipment away from the quench and cooling section conveyor.

5. A glass tempering system, said system comprising:
   a furnace loading section;
   a heating furnace including a thermally insulated chamber fitted with heating means;
   a quench and cooling section including cooling equipment fitted with air blowers;
   an unloading section;
   conveyors in each section and in the furnace, each conveyor being comprised of horizontal rollers transverse to the glass carrying direction;
   clutch mechanisms for selectively connecting and driving the separate conveyors in unison or separately;
   conveyor drive means, coupled with the furnace conveyor and the quench and cooling section conveyor, for driving each conveyor in a first operational cycle in an oscillating fashion and in a second operation cycle for effecting a long conveying stroke, said first operational cycle including first and second oscillation steps, said furnace conveyor and said quench and cooling section conveyor being coupled with each other by a mechanical coupling through a first clutch mechanism with a direct 1:1 transmission ratio during the first oscillation step for quenching of a glass sheet load in the quench and cooling section and for reestablishing a thermal equilibrium in the furnace with the furnace unloaded, said mechanical coupling being the same as the mechanical coupling used for effecting the long conveying stroke such that said conveyors of the furnace and the quench and cooling section oscillate at the same rate and the same stroke length in the first oscillation step, timing means for continuing the first oscillation step until the center of the glass sheets of the load is lower than the strain point of the particular glass sheet load, means for permitting movement of a glass sheet load on the loading section into the furnace after the first oscillation step, and in the second oscillation step, during which a glass sheet load passed into the furnace is oscillated in the furnace and a quenched glass sheet load is cooled to a suitable handling temperature, the quench and cooling section conveyor being mechanically coupled through another clutch mechanism with the furnace conveyor through a reduction gear having a transmission ratio of at least 10:1.

6. The system as set forth in claim 5, wherein said drive means comprises a unidirectional AC-motor, an hydraulic variator driven by said motor, a first transmission shaft between said hydraulic variator and the furnace conveyor, a second transmission shaft connected to the quench and cooling section conveyor, a first mechanical transmission element between said first and second transmission shafts, a magnetic clutch for uncoupling the mechanical transmission of said first transmission element from the second transmission shaft, a second mechanical transmission element between said shafts, the gear ratio of said second transmission element being at least ten times higher than that of said first transmission element, and a second magnetic clutch for uncoupling the mechanical transmission of said second transmission element from the second transmission shaft.

7. The system as set forth in claim 5, further comprising means for drawing the cooling equipment away from the quench and cooling section conveyor.

8. A method of driving a horizontal glass tempering system, said system including a loading section, a heating furnace including a thermally insulated chamber with heating means therein, a quench and cooling section having cooling equipment therein including air blowers, an unloading section, conveyors in each section and in the furnace, each conveyor being comprised of horizontal rollers transverse to the glass carrying direction, drive mechanisms for the conveyors, clutch mechanisms for driving the separate conveyors in unison or separately; the glass tempering system oscillating the rollers of the furnace conveyor back and forth while heating the glass sheets to a tempering temperature and oscillating the quench and cooling section conveyor back and forth while effecting the quenching of glass sheets; the method comprising the steps of:

oscillating the furnace conveyor mechanically coupled together with the quench and cooling section conveyor while quenching a glass sheet load in the quench and cooling section with the furnace being in an unloaded condition to reestablish a thermal equilibrium in the furnace;

coupling the quench and cooling section conveyor with the furnace conveyor after a glass sheet load in the quench and cooling section is quenched with the temperature in the center of glass sheets being lower than the strain point of the particular glass raw material through a reduction gear having a high gear ratio; and subsequently moving a fresh glass sheet load to be heated into the furnace.

9. The method as set forth in claim 8, further comprising the steps of:

uncoupling said reduction gear as soon as a glass sheet load in the quench and cooling section is cooled to a suitable handling temperture while the glass sheet load is oscillated in the furnace;

coupling the quench and cooling section conveyor mechanically with the unloading section conveyor for moving the glass sheet load from the quench and cooling section to the unloading section; and continuing the oscillation of the glass sheet load in the furnace while the quench and cooling section is unloaded without a glass sheet load to be quenched or cooled.

10. The method as set forth in claim 8, wherein the gear ratio of the reduction gear is sufficiently high such that, at the maximum rate of speed of the oscillation of the furnace conveyor, the maximum rate of speed of the glass sheet load in the quench and cooling section is less than or equal to 2.5 cm/sec.

11. The method as set forth in claim 8, further comprising the step of drawing the cooling equipment away from the quench and cooling section conveyor.

12. A glass tempering system, said system comprising:

a furnace loading section;

a heating furnace including a thermally insulated chamber fitted with heating means;

a quench and cooling section including cooling equipment fitted with air blowers;

an unloading section;

conveyors in each section and in the furnace, each conveyor being comprised of horizontal rollers transverse to the glass carrying direction;

clutch mechanisms for selectively connecting and driving the separate conveyors in unison or separately;

conveyor drive means, coupled with the furnace conveyor and the quench and cooling section conveyor, for driving each conveyor in a first operational cycle in an oscillating fashion and in a second operational cycle for effecting a long conveying stroke, said first operational cycle including first and second oscillation steps, said furnace conveyor and said quench and cooling section conveyor being coupled with each other by a mechanical coupling through a first clutch mechanism with a direct 1:1 transmission ratio during the first oscillation step for quenching of a glass sheet load in the quench and cooling section and for reestablishing a thermal equilibrium in the furnace with the furnace unloaded, said mechanical coupling being the same as the mechanical coupling used for effecting the long conveying stroke such that said conveyors of the furnace and the quench and cooling section oscillate at the same rate and the same stroke length in the first oscillation step, timing means for continuing the first oscillation step until the center of the glass sheets of the load in the quench and cooling section is lower than the strain point of the particular glass sheet load, means for permitting movement of a glass sheet load on the loading section into the furnace after the first oscillation step, and in the second oscillation step, during which a glas sheet load passed into the furnace is oscillated in the furnace and a quenched glass sheet load is cooled to a suitable handling temperature, the quench and cooling section conveyor being uncoupled from the furnace conveyor and thus completely stopped.

13. The system as set forth in claim 12, wherein said drive means comprises a unidirectional AC-motor, an hydraulic variator driven by said motor, a first transmission shaft between said hydraulic variator and the furnace conveyor, a second transmission shaft connected to the quench and cooling section conveyor, a first mechanical transmission element between said first and second transmission shafts, a magnetic clutch for uncoupling the mechanical transmission of said first transmission element from the second transmission shaft, a second mechanical transmission element being at least ten times higher than that of said first transmission element, and a second magnetic clutch for uncoupling the mechanical transmission of said second transmission element from the second transmission shaft.

14. The system as set forth in claim 12, further comprising means for drawing the cooling equipment away from the quench and cooling section conveyor.

* * * * *